United States Patent
Huang et al.

(10) Patent No.: US 11,329,478 B2
(45) Date of Patent: May 10, 2022

(54) POWER CONVERSION SYSTEM WITH ABNORMAL ENERGY PROTECTION AND METHOD OF OPERATING THE SAME

(71) Applicant: DELTA ELECTRONICS, INC., Taoyuan (TW)

(72) Inventors: Wen-Lung Huang, Taoyuan (TW); Sheng-Hua Li, Taoyuan (TW)

(73) Assignee: DELTA ELECTRONICS, INC, Taoyuan (TW)

( * ) Notice: Subject to any disclaimer, the term of this patent is extended or adjusted under 35 U.S.C. 154(b) by 739 days.

(21) Appl. No.: 16/180,409

(22) Filed: Nov. 5, 2018

(65) Prior Publication Data
US 2020/0091704 A1    Mar. 19, 2020

(30) Foreign Application Priority Data
Sep. 18, 2018   (CN) .......................... 201811085654.3

(51) Int. Cl.
*H02H 7/12*   (2006.01)

(52) U.S. Cl.
CPC .................. *H02H 7/1213* (2013.01)

(58) Field of Classification Search
CPC ...... H02H 7/1213; H02H 3/202; H02H 9/041; H02M 1/32; H02M 3/1584; H02J 3/383
USPC ............................................................ 307/82
See application file for complete search history.

(56) References Cited

U.S. PATENT DOCUMENTS

| | | | | |
|---|---|---|---|---|
| 8,842,404 | B2* | 9/2014 | Vogel | H02H 3/025 361/93.1 |
| 2009/0167097 | A1* | 7/2009 | Seymour | H02J 3/383 307/113 |
| 2012/0026769 | A1* | 2/2012 | Schroeder | H02J 3/381 363/131 |
| 2013/0328403 | A1 | 12/2013 | Kaufman et al. | |

(Continued)

FOREIGN PATENT DOCUMENTS

| | | |
|---|---|---|
| CN | 107994791 A | 5/2018 |
| DE | 102013110240 A1 | 3/2015 |

(Continued)

OTHER PUBLICATIONS

Office Action dated Feb. 22, 2021 in CN Application No. 201811085654. 3, 6 pages.

(Continued)

*Primary Examiner* — Alfonso Perez Borroto
(74) *Attorney, Agent, or Firm* — Muncy, Geissler, Olds & Lowe, PC

(57) ABSTRACT

A power conversion system with abnormal energy protection includes a plurality of DC input power sources, a plurality of DC power converters, two output capacitors, and a protection circuit. An input side of each DC power converter is correspondingly coupled to one of the DC input power sources, and output sides of the DC power converters are coupled in parallel to each other to form a DC output bus. Two output capacitors are coupled in series between a positive voltage end and a negative voltage end of the DC output bus. The protection circuit is coupled between the DC input power sources and the two output capacitors. When one of the two output capacitors is abnormal, the protection circuit decouples the DC input power sources from the two output capacitors in a shorted-circuit manner.

4 Claims, 8 Drawing Sheets

(56) References Cited

U.S. PATENT DOCUMENTS

2014/0253138 A1* 9/2014 Ishii ................. G01R 31/52
                                                      324/509
2016/0226256 A1* 8/2016 Falk .................. H02H 7/20
2016/0245855 A1* 8/2016 Serban ............. G01R 27/025
2016/0329715 A1* 11/2016 Orr ................... H02S 50/00
2017/0365999 A1* 12/2017 Cao .................. H02J 3/381

FOREIGN PATENT DOCUMENTS

| JP | 2013150431 A | 8/2013 |
|---|---|---|
| TW | 200950288 A | 12/2009 |
| WO | WO-2015/069238 A1 | 5/2015 |

OTHER PUBLICATIONS

European Search Report dated Jun. 25, 2019 in EP Application No. 18205052.6, 11 pages.
Office Action dated Nov. 26, 2019 in JP Application No. 2018-208957, 3 pages.
Office Action dated Apr. 16, 2019 in TW Application No. 107132725, 6 pages.

* cited by examiner

POWER CONVERSION SYSTEM WITH ABNORMAL ENERGY PROTECTION AND METHOD OF OPERATING THE SAME

BACKGROUND

Technical Field

The present disclosure relates to a power conversion system and a method of operating the same, and more particularly to a power conversion system with abnormal energy protection and a method of operating the same.

Description of Related Art

The statements in this section merely provide background information related to the present disclosure and do not necessarily constitute prior art.

Please refer to FIG. 1, which shows a block circuit diagram of a protection mechanism with abnormal energy protection in the related art. A plurality of DC input power sources Vdc1-Vdcn generate DC power sources, and the DC power sources are stepped up by the corresponding DC step-up converters 11A-1$n$A to supply power to rear-end capacitors 21A, 22A. Therefore, stable DC output voltages are provided across two ends of the capacitors 21A, 22A to supply the required power to a rear-end circuit 40A, such as an inverter circuit.

If any one of the capacitors 21A, 22A, e.g., the capacitor 21A fails due to a shorted-circuit abnormality or an over-voltage abnormality, the DC voltages generated from the DC input power sources Vdc1-Vdcn would be withstood by the normal capacitor, i.e., the capacitor 22A. However, the capacitor 22A would be damaged to cause leakage of liquid electrolyte from the capacitor 22A due to insufficient withstand voltage of the capacitor 22A, thereby affecting operations of the whole system.

In order to solve the above-mentioned problem, a plurality of relay switches 31A-3$n$A are used and installed between the DC input power sources Vdc1-Vdcn and the DC step-up converters 11A-1$n$A. Therefore, if any one of the capacitors 21A, 22A fails due to the shorted-circuit abnormality or the overvoltage abnormality, the relay switches 31A-3$n$A are turned off so that the DC input power sources Vdc1-Vdcn decouple (disconnect) from the DC step-up converters 11A-1$n$A. Accordingly, it is to avoid damaging the capacitors 21A, 22A and affecting the rear-end circuit 40A while the DC input power sources Vdc1-Vdcn continuously supply power.

However, the use of relay switches 31A-3$n$A for decoupling the DC input power sources Vdc1-Vdcn and the DC step-up converters 11A-1$n$A has the following problems and disadvantages.

1. The relay switch 31A-3$n$A capable of withstanding up to thousands of voltages is uncommon as well as expensive.

2. For each power supplying path, the relay switch 31A-3$n$A is required so that the occupied area on the printed circuit board (PCB) is large.

3. Under the normal operations, the generated heat reduces the efficiency.

4. There are problems of reduced life span and poor reliability when the relay switches 31A-3$n$A repeatedly work for a long time due to the mechanical structure of the relay switches 31A-3$n$A.

5. There are problems of increased complexity of the circuit design and control since an additional pre-charge circuit is required to coordinate with the relay switches 31A-3$n$A.

SUMMARY

An objective of the present disclosure is to provide a power conversion system with abnormal energy protection to solve a problem of using relay switches for the abnormal energy protection.

In order to achieve the aforementioned objective, the power conversion system with abnormal energy protection includes a plurality of DC input power sources, a plurality of DC power converters, two output capacitors, and a protection circuit. An input side of each DC power converter is correspondingly coupled to one of the DC input power sources, and output sides of the DC power converters are coupled in parallel to each other to form a DC output bus. The two output capacitors are coupled in series between a positive voltage end and a negative voltage end of the DC output bus. The protection circuit is coupled between the DC input power sources and the two output capacitors. When any one of the two output capacitors is abnormal, the protection circuit decouples the DC input power sources from the two output capacitors in a shorted-circuit manner.

Accordingly, the power conversion system with abnormal energy protection is provided to reduce heat losses, increase efficiency, increase the available area of the printed circuit board (PCB), and increase the expansion of the protection circuit.

Another objective of the present disclosure is to provide a method of operating a power conversion system with abnormal energy protection to solve a problem of using relay switches for the abnormal energy protection.

In order to achieve the aforementioned objective, the power conversion system includes a plurality of DC input power sources, a plurality of DC power converters, and two output capacitors, and the method of operating the power conversion system with abnormal energy protection includes the steps of: (a) providing a protection circuit, and the protection circuit coupled between the DC input power sources and the two output capacitors, (b) detecting whether any one of the two output capacitors is abnormal, and (c) controlling the protection circuit to decouple the DC input power sources from the two output capacitors in a shorted-circuit manner when any one of the two output capacitors is abnormal.

Accordingly, the method of operating the power conversion system with abnormal energy protection is provided to reduce heat losses, increase efficiency, increase the available area of the printed circuit board (PCB), and increase the expansion of the protection circuit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
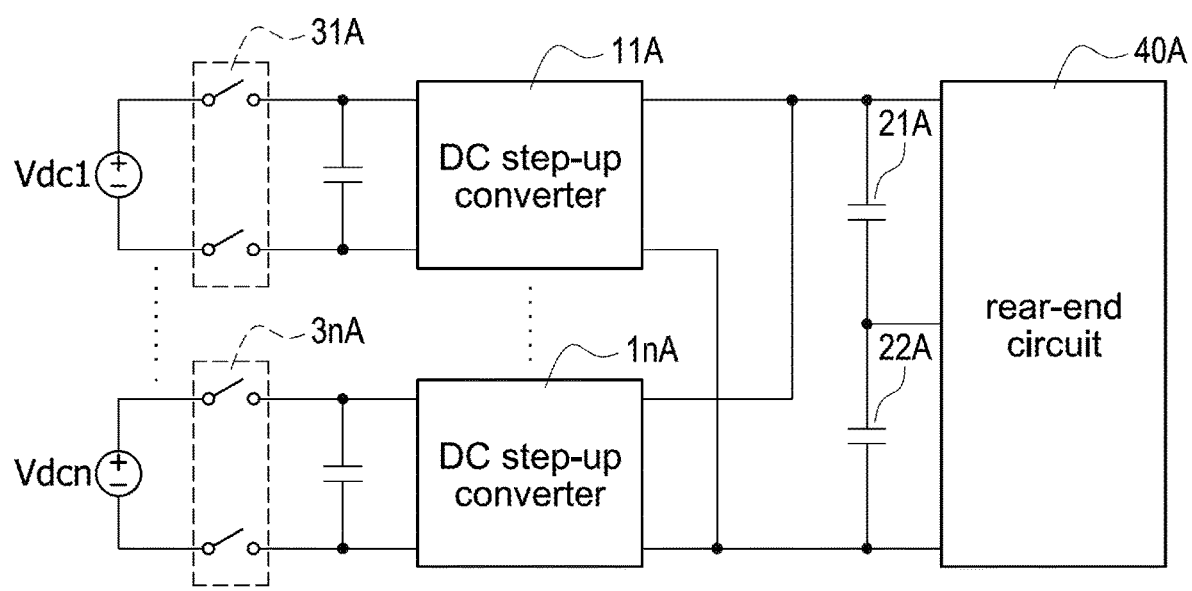
FIG. 1 is a block circuit diagram of a protection mechanism with abnormal energy protection in the related art.

Reference will now be made to the drawing figures to describe the present disclosure in detail. It will be understood that the drawing figures and exemplified embodiments of present disclosure are not limited to the details thereof.

Figure 2A:
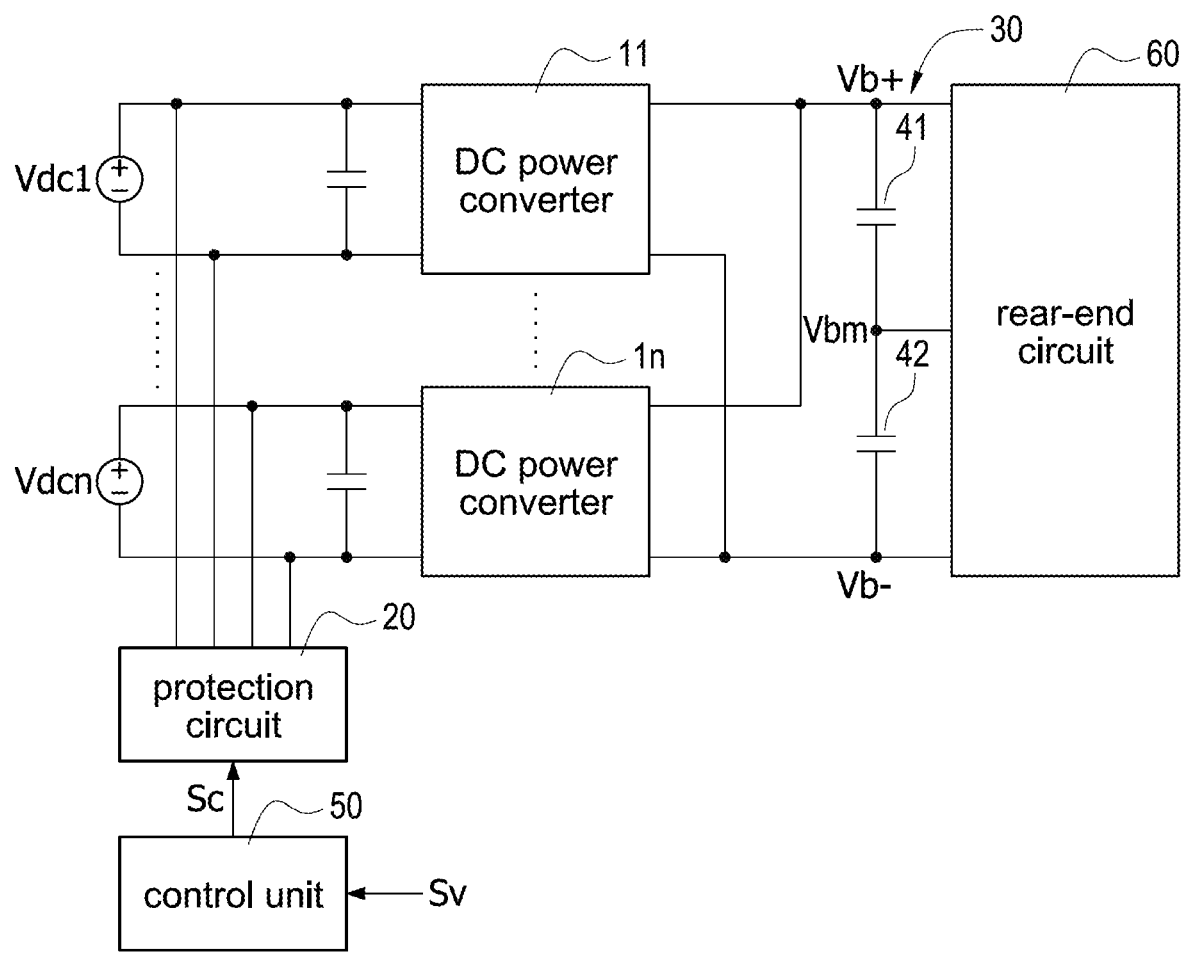
FIG. 2A is a block circuit diagram of a first architecture of a power conversion system with abnormal energy protection of the present disclosure.

Please refer to FIG. 2A, which shows a block circuit diagram of a first architecture of a power conversion system with abnormal energy protection of the present disclosure. The power conversion system with abnormal energy protection includes a plurality of DC input power sources Vdc1-Vdcn, a plurality of DC power converters 11-1n, two output capacitors 41,42, a protection circuit 20, and a control unit 50. In one embodiment, each DC input power source Vdc1-Vdcn may be a current-source type DC power source, such as but not limited to a solar power source with photovoltaic panels. Take the photovoltaic panels for example, each DC input power source Vdc1-Vdcn may be composed of a plurality of series-connected photovoltaic panel.

An input side of each DC power converter 11-1n is correspondingly coupled to one of the DC input power sources Vdc1-Vdcn. As shown in FIG. 2A, the n DC power converters 11-1n are respectively a first DC power converter 11, a second DC power converter 12, . . . , and a nth DC power converter 1n. Each DC power converter may be a step-up DC-to-Dc converter. Further, each DC power converter may be an isolated DC converter or a non-isolated DC converter. The input side of the first DC power converter 11 is coupled to a first DC input power source Vdc1, . . . , and the input side of the nth DC power converter 1n is coupled to a nth DC input power source Vdcn.

Also, the output sides of the DC power converters 11-1n are coupled in parallel to each other to form a DC output bus 30. As shown in FIG. 2A, one end of the in-parallel connection is coupled to a positive voltage end Vb+ of the DC output bus 30, and the other end of the in-parallel connection is coupled to a negative voltage end Vb− of the DC output bus 30.

The two output capacitors 41,42 are a first output capacitor 41 and a second output capacitor 42, and the two output capacitors 41,42 are coupled in series between the positive voltage end Vb+ and the negative voltage end Vb− of the DC output bus 30. Also, the two output capacitors 41,42 are commonly coupled at an intermediate voltage end Vbm. If the two output capacitors 41,42 are identical in specifications, a voltage across the first output capacitor 41 coupled between the positive voltage end Vb+ and the intermediate voltage end Vbm is equal to a voltage across the second output capacitor 42 coupled between the intermediate voltage end Vbm and the negative voltage end Vb−. Therefore, the two output capacitors 41,42 provide the stable DC output voltages for a rear-end circuit 60.

In one embodiment, the protection circuit 20 is coupled between the DC input power sources Vdc1-Vdcn and the DC power converters 11-1n. If any one of the two output capacitors 41,42 is damaged by the electrical energy generated from the DC input power sources Vdc1-Vdcn, the protection circuit 20 is provided to protect the other output capacitor, i.e., the normal output capacitor. Specifically, the control unit 50 is coupled to the protection circuit 20 and receives a voltage state signal Sv provided from the DC output bus 30. In particular, the voltage state signal Sv may represent a voltage magnitude of the positive voltage end Vb+, a voltage magnitude of the negative voltage end Vb−, or a voltage magnitude of the intermediate voltage end Vbm. Hence, the control unit 50 determines whether the voltage across the first output capacitor 41 or the voltage across the second output capacitor 42 is abnormal, such as a shorted-circuit abnormality or an overvoltage abnormality according to the voltage state signal Sv. When one of the two output capacitors 41,42 is abnormal, the protection circuit 20 provides the control signal Sc to decouple the DC input power sources Vdc1-Vdcn from the two output capacitors 41,42 in a shorted-circuit manner so as to avoid the electrical energy generated from the DC input power sources Vdc1-Vdcn delivering to the normal output capacitor.

Figure 2B:
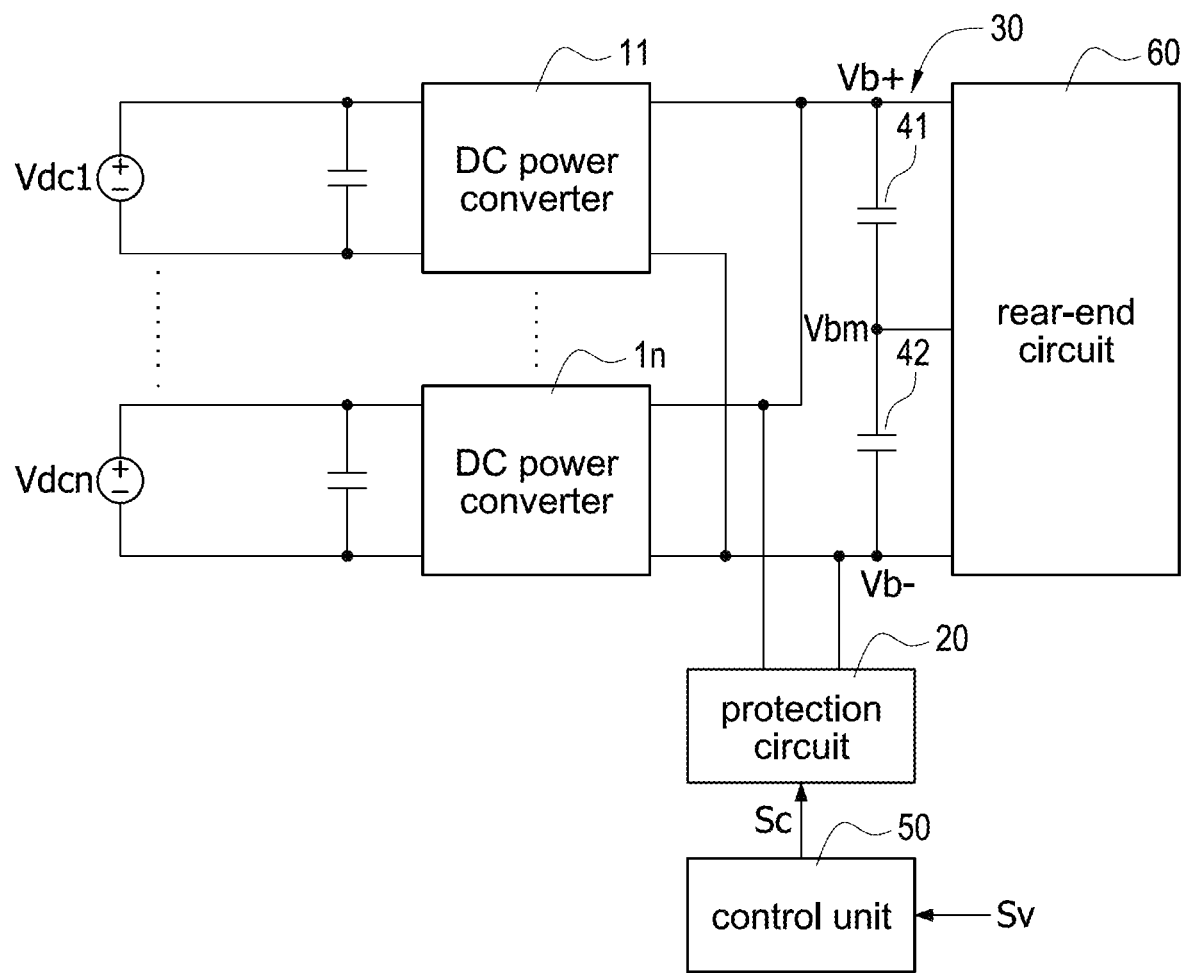
FIG. 2B is a block circuit diagram of a second architecture of the power conversion system with abnormal energy protection of the present disclosure.

Please refer to FIG. 2B, which shows a block circuit diagram of a second architecture of the power conversion system with abnormal energy protection of the present disclosure. The major difference between the FIG. 2B and the FIG. 2A is that the protection circuit 20 is coupled between the DC power converters 11-1n and the two output capacitors 41,42 in the former (FIG. 2B). Similarly, when one of the two output capacitors 41,42 is abnormal, the protection circuit 20 provides the control signal Sc to decouple the DC input power sources Vdc1-Vdcn from the two output capacitors 41,42 in a shorted-circuit manner so as to avoid the electrical energy generated from the DC input power sources Vdc1-Vdcn delivering to the normal output capacitor.

In summary, the protection circuit 20 may be coupled to power paths between the DC input power sources Vdc1-Vdcn and the two output capacitors 41,42 so as to decouple the DC input power sources Vdc1-Vdcn from the two output capacitors 41,42 by the shorted-circuit manner to protect the two output capacitors 41,42. The detailed operation of the protection circuit 20 will be described below.

Figure 3:
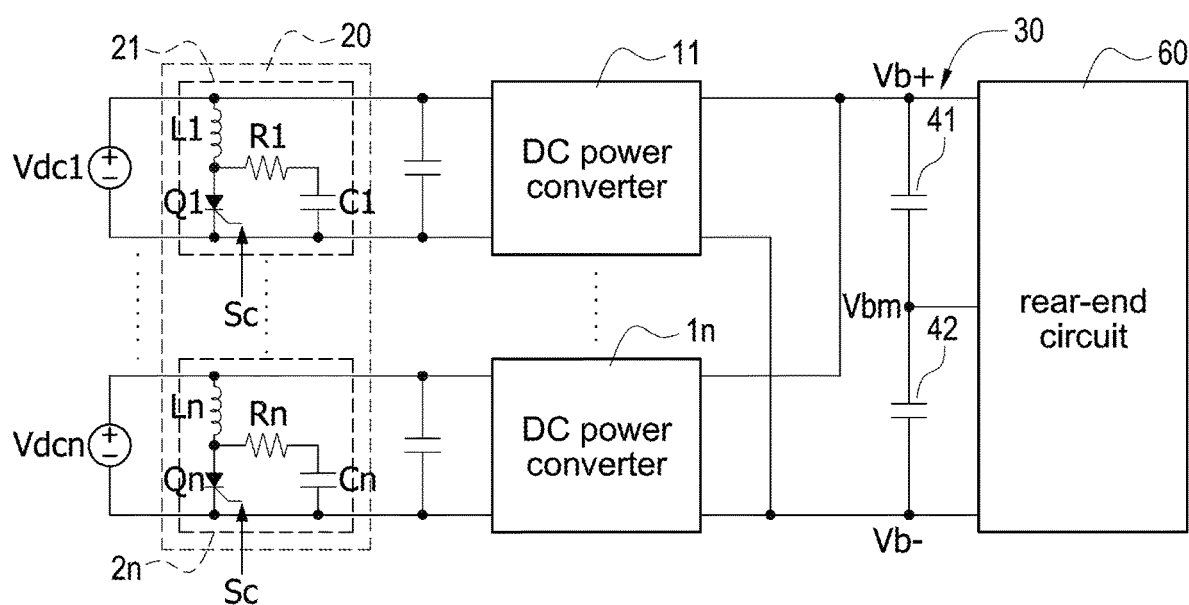
FIG. 3 is a circuit diagram of a protection circuit of the power conversion system with abnormal energy protection according to a first embodiment of the present disclosure.

Please refer to FIG. 3, which shows a circuit diagram of a protection circuit of the power conversion system with abnormal energy protection according to a first embodiment of the present disclosure. The protection circuit 20 is coupled between the DC input power sources Vdc1-Vdcn and the DC power converters 11-1n. The protection circuit 20 includes a plurality of protection units 21-2n. Each protection unit 21-2n includes an inductor L1-Ln, a semiconductor switch Q1-Qn, a resistor R1-Rn, and a capacitor C1-Cn. The inductor L1-Ln is coupled in series to the semiconductor switch Q1-Qn to form a series-connected branch, and the series-connected branch is coupled between a positive voltage end and a negative voltage end of the DC input power source Vdc1-Vdcn. The capacitor C1-Cn is coupled in series to the resistor R1-Rn to form a series-connected auxiliary branch, and the series-connected auxiliary branch is coupled between a common-connected point of the inductor L1-Ln and the semiconductor switch Q1-Qn and the negative voltage end. In one embodiment, each semiconductor switch Q1-Qn may be a silicon controlled rectifier (SCR), a metal-oxide-semiconductor field-effect transistor (MOSFET), an insulated gate bipolar transistor (IGBT), a bipolar junction transistor (BJT), or other semiconductor components with the switching function.

When the control unit 50 determines that any one of the two output capacitors 41,42 is abnormal, such as a shorted-circuit abnormality or an overvoltage abnormality according to the voltage state signal Sv, the control unit 50 provides the control signals Sc to turn on the semiconductor switches Q1-Qn of the protection units 21-2$n$ so that the series-connected branch is shorted-circuit to make the current generated from the DC input power source Vdc1-Vdcn flow through the series-connected branch, thereby decoupling the rear-end circuits and protecting the output capacitors 41,42. In this embodiment, the inductors L1-Ln are used to suppress the inrush current, and the capacitors C1-Cn cooperated with the resistors R1-Rn are used to absorb the spike voltage and consume the energy generated from the spike voltage.

Figure 4:
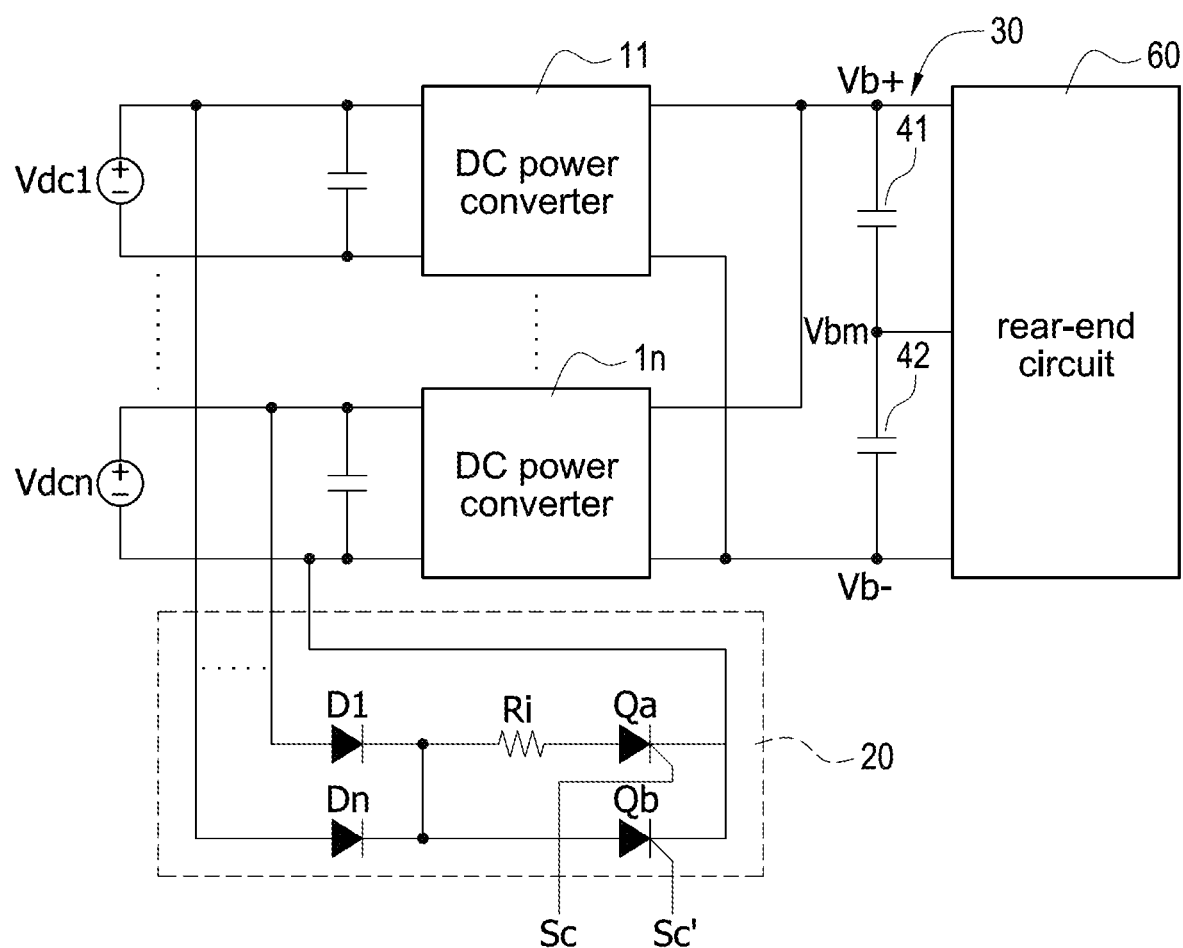
FIG. 4 is a circuit diagram of the protection circuit of the power conversion system with abnormal energy protection according to a second embodiment of the present disclosure.

Please refer to FIG. 4, which shows a circuit diagram of the protection circuit of the power conversion system with abnormal energy protection according to a second embodiment of the present disclosure. The protection circuit 20 is coupled between the DC input power sources Vdc1-Vdcn and the DC power converters 11-1$n$. The protection circuit 20 includes a plurality of diodes D1-Dn, first semiconductor switch Qa, a second semiconductor switch Qb, and a resistor Ri. An anode end of each diode D1-Dn is correspondingly coupled to the positive voltage end of the DC input power source Vdc1-Vdcn, and cathode ends of the diodes D1-Dn are commonly coupled to each other to form a cathode common-connected point. The first semiconductor switch Qa is coupled between the cathode common-connected point and the negative voltage end of any one of the DC input power sources Vdc1-Vdcn. The second semiconductor switch Qb is coupled in parallel to the first semiconductor switch Qa. The resistor Ri is coupled to the cathode common-connected point and the first semiconductor switch Qa.

When the control unit 50 determines that any one of the two output capacitors 41,42 is abnormal, such as the shorted-circuit abnormality or the overvoltage abnormality according to the voltage state signal Sv, the control unit 50 provides the control signals Sc to turn on the first semiconductor switch Qa of the protection circuit 20 so that a first branch to which the first semiconductor switch Qa is coupled is shorted-circuit to make the current generated from the DC input power source Vdc1-Vdcn flow through the first branch, thereby decoupling the rear-end circuits and protecting the output capacitors 41,42. After a delay time, the control unit 50 further provides a control signal Sc' to turn on the second semiconductor switch Qb so that the current generated from the DC input power source Vdc1-Vdcn flows through a second branch to which the second semiconductor switch Qb is coupled instead of the first branch due to the lower impedance of the second branch. Therefore, the heat generated from the current flowing through the resistor Ri can be removed under the condition of decoupling the rear-end circuits.

As shown in FIG. 4, the difference between the control signal Sc' and the control signal Sc is that the control signal Sc' is used to control the second semiconductor switch Qb after the delay time. In particular, the delay time may be implemented by a hardware solution, such as a delay time circuit or other digital or analog circuits, or by a software or firmware solution. In this embodiment, the resistor Ri is used to suppress the inrush current, and the diodes D1-Dn are used to provides forward current paths to allow the current to pass in diode's forward direction.

Figure 5:
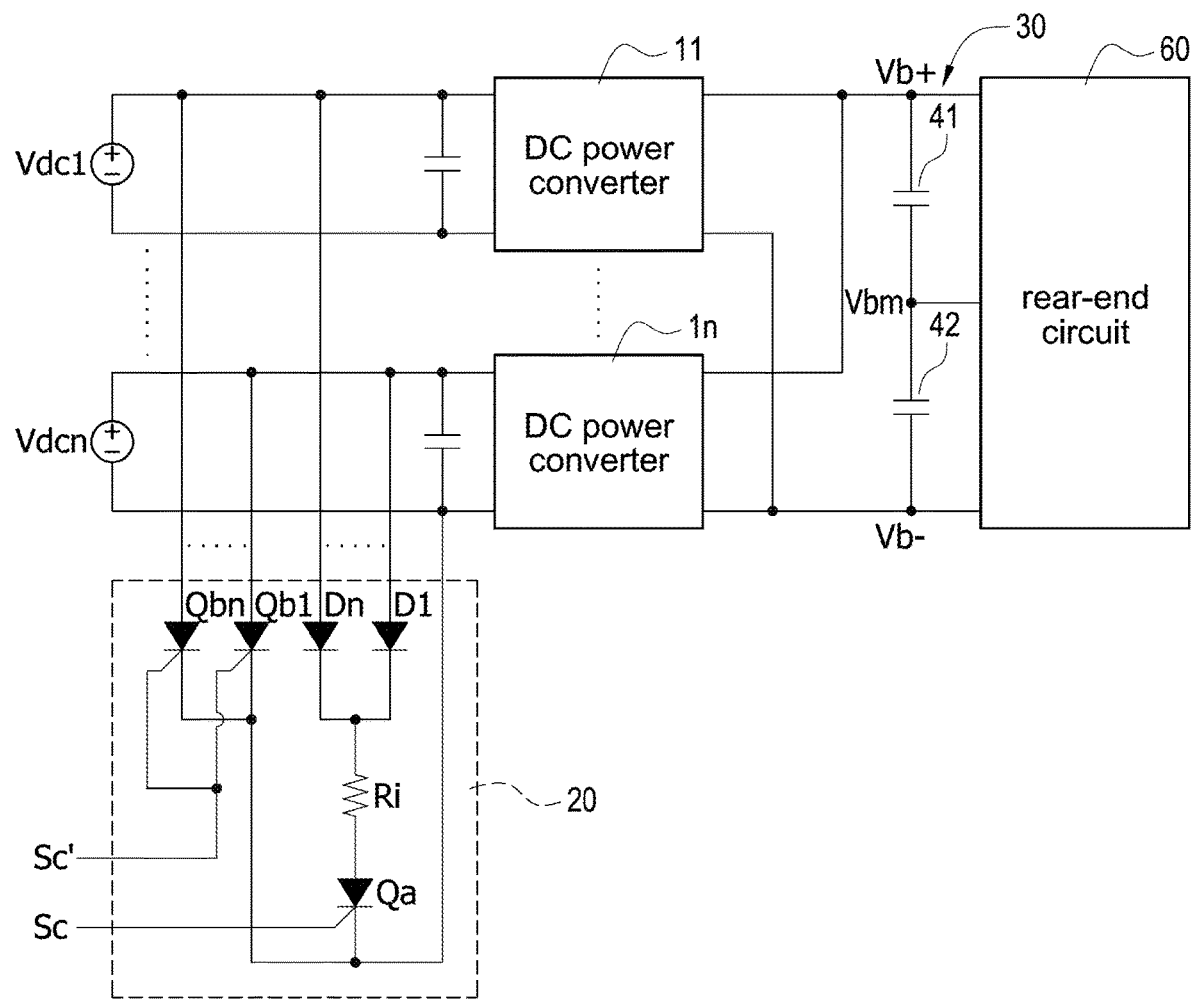
FIG. 5 is a circuit diagram of the protection circuit of the power conversion system with abnormal energy protection according to a third embodiment of the present disclosure.

Please refer to FIG. 5, which shows a circuit diagram of the protection circuit of the power conversion system with abnormal energy protection according to a third embodiment of the present disclosure. The major difference between the FIG. 5 and the FIG. 4 is that a plurality of second semiconductor switches Qb1-Qbn are used for current sharing in the former when the second semiconductor switches Qb are turned on after the delay time. First ends of the second semiconductor switches Qb are respectively coupled to the positive voltage ends of the DC input power sources Vdc1-Vdcn, and second ends of the second semiconductor switches Qb are commonly coupled to each other and then coupled to the negative voltage ends of the DC input power sources Vdc1-Vdcn.

When the control unit 50 determines that any one of the two output capacitors 41,42 is abnormal, such as the shorted-circuit abnormality or the overvoltage abnormality according to the voltage state signal Sv, the control unit 50 provides the control signals Sc to turn on the first semiconductor switch Qa of the protection circuit 20 so that a first branch to which the first semiconductor switch Qa is coupled is shorted-circuit to make the current generated from the DC input power source Vdc1-Vdcn flow through the first branch, thereby decoupling the rear-end circuits and protecting the output capacitors 41,42. After a delay time, the control unit 50 further provides a control signal Sc' to turn on the second semiconductor switches Qb1-Qbn so that the current generated from the DC input power source Vdc1-Vdcn flows through branches to which the second semiconductor switches Qb1-Qbn are coupled instead of the first branch due to the lower impedances of the branches. Therefore, the heat generated from the current flowing through the resistor Ri can be removed under the condition of decoupling the rear-end circuits. Moreover, each second semiconductor switch Qb1-Qbn would not be damaged from excessive heat since the current evenly flows through the second semiconductor switches Qb1-Qbn.

Figure 6:
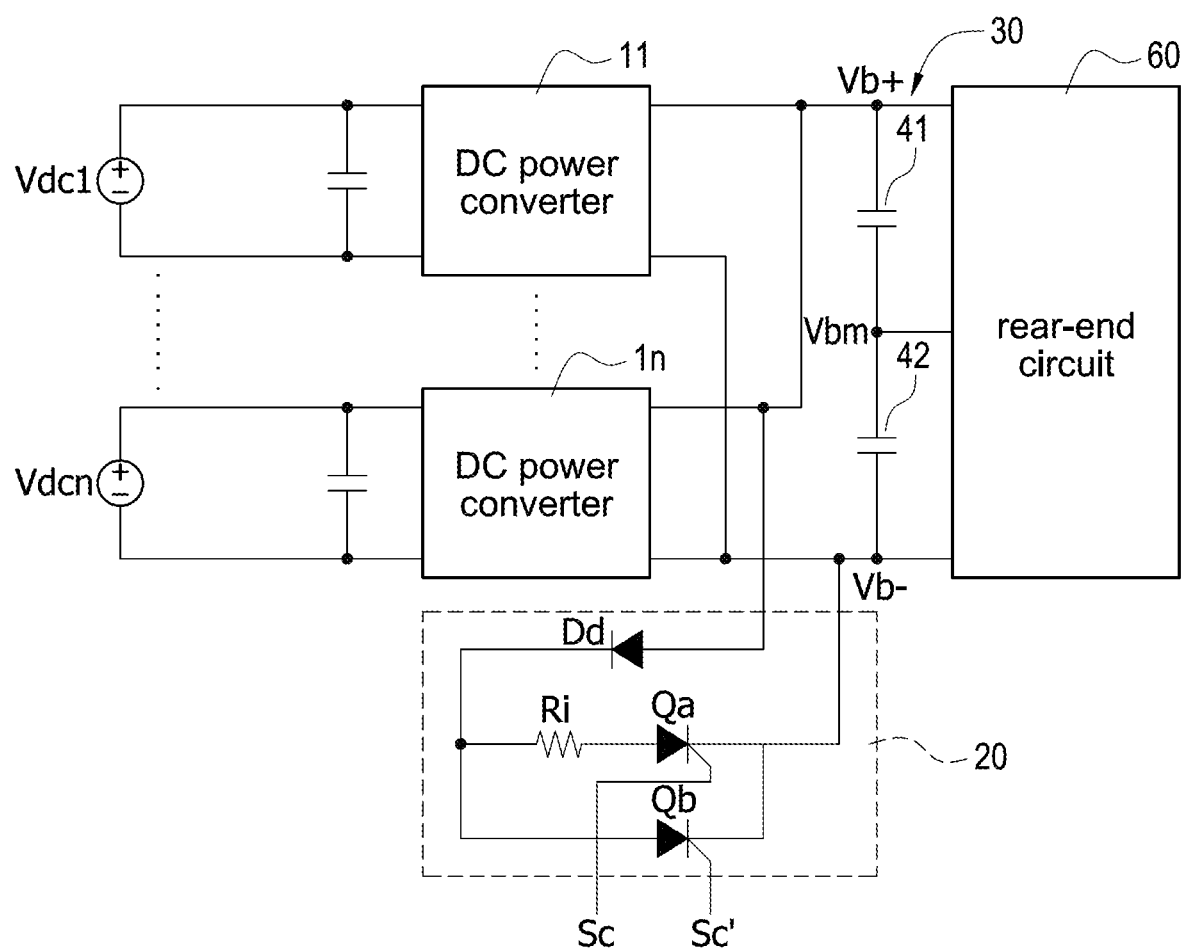
FIG. 6 is a circuit diagram of the protection circuit of the power conversion system with abnormal energy protection according to a fourth embodiment of the present disclosure.

Please refer to FIG. 6, which shows a circuit diagram of the protection circuit of the power conversion system with abnormal energy protection according to a fourth embodiment of the present disclosure. The protection circuit 20 is coupled between the DC power converters 11-1$n$ and the two output capacitors 41,42. The protection circuit 20 includes a diode Dd, a first semiconductor switch Qa, a second semiconductor switch Qb, and a resistor Ri. An anode end of the diode Dd is coupled to the positive voltage end Vb+ of the DC output bus 30. The first semiconductor switch Qa is coupled between a cathode end of the diode Dd and the negative voltage end Vb− of the DC output bus 30. The second semiconductor switch Qb is coupled in parallel to the first semiconductor switch Qa. The resistor Ri is coupled to the cathode end of the diode Dd and the first semiconductor switch Qa.

When the control unit 50 determines that any one of the two output capacitors 41,42 is abnormal, such as the shorted-circuit abnormality or the overvoltage abnormality according to the voltage state signal Sv, the control unit 50 provides the control signals Sc to turn on the first semiconductor switch Qa of the protection circuit 20 so that a first branch to which the first semiconductor switch Qa is coupled is shorted-circuit to make the current generated from the DC power converters 11-1n by converting the DC input power sources Vdc1-Vdcn flows through the first branch, thereby decoupling the rear-end circuits and protecting the output capacitors 41,42. After a delay time, the control unit 50 further provides a control signal Sc' to turn on the second semiconductor switch Qb so that the current generated from the DC power converters 11-1n flows through a second branch to which the second semiconductor switch Qb is coupled instead of the first branch due to the lower impedance of the second branch. Therefore, the heat generated from the current flowing through the resistor Ri can be removed under the condition of decoupling the rear-end circuits. In this embodiment, the resistor Ri is used to suppress the inrush current, and the diodes D1-Dn are used to provides forward current paths to allow the current to pass in diode's forward direction.

Figure 7:
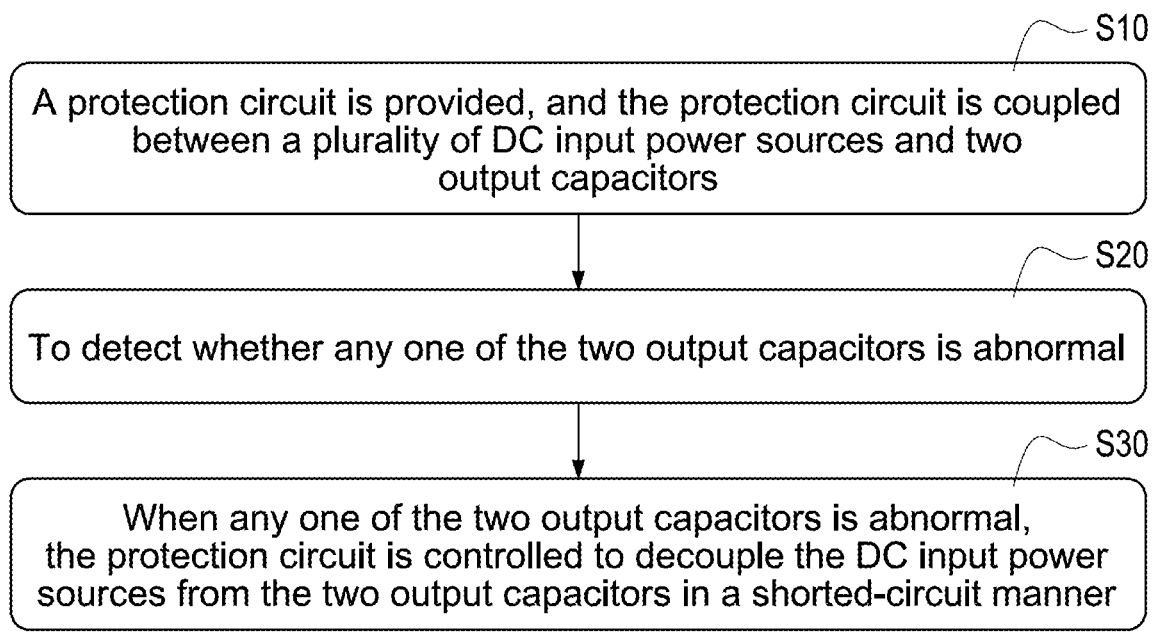
FIG. 7 is a flowchart of a method of operating a power conversion system with abnormal energy protection.

Please refer to FIG. 7, which shows a flowchart of a method of operating a power conversion system with abnormal energy protection. The power conversion system with abnormal energy protection includes a plurality of DC input power sources, a plurality of DC power converters, and two output capacitors. In one embodiment, each DC input power source may be a current-source type DC power source, such as but not limited to a solar power source with photovoltaic panels. The method includes the steps as follows. First, a protection circuit is provided, and the protection circuit is coupled between the DC input power sources and the two output capacitors (S10), i.e., the protection circuit may be coupled between the DC input power sources and the DC power converters, or the protection circuit may be coupled between the DC power converters and the two output capacitors. Afterward, it is to detect whether any one of the two output capacitors is abnormal (S20). For example, by detecting a voltage across each output capacitor to determine whether any one of the two output capacitors is abnormal, such as the shorted-circuit abnormality or the overvoltage abnormality. Finally, when any one of the two output capacitors is abnormal, the protection circuit is controlled to decouple the DC input power sources from the two output capacitors in a shorted-circuit manner (S30). Accordingly, it is to disconnect the electrical energy generated from the DC input power sources be delivered to the other output capacitor, i.e., the normal one, thereby preventing the normal output capacitor from the continuous electrical energy. In other words, the protection circuit decouples the DC input power sources from the two output capacitors in a shorted-circuit manner so as to avoid the electrical energy generated from the DC input power sources delivering to the normal output capacitor.

In conclusion, the present disclosure has following features and advantages:

1. There would be no heat loss under the normal operation since the semiconductor switches are only activated once the output capacitor is abnormal, and also there would be no heat generated from the relay switches, thereby reducing heat losses and increasing efficiency.

2. The protection circuit used for the abnormal energy protection could reduce costs of the system.

3. Only one protection circuit is used to achieve the abnormal energy protection, thus increasing the available area of the printed circuit board.

4. The parallel-connected structure of the protection circuit increases the expansion thereof.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of operating a power conversion system with abnormal energy protection, the power conversion system comprising a plurality of DC input power sources, a plurality of DC power converters, and two output capacitors, the method comprising the steps of:

(a) providing a protection circuit, and the protection circuit coupled between the DC input power sources and the DC power converters, or the protection circuit coupled between the DC power converters and the two output capacitors, wherein the protection circuit comprising a resistor and a first semiconductor switch connected in series to form a series-connected branch, and at least one second semiconductor switch; wherein the series-connected branch is coupled between a positive voltage end and a negative voltage end of the DC input power source, or the series-connected branch is coupled between a positive voltage end and a negative voltage end of the two output capacitors; wherein the at least one second semiconductor switch is coupled between the positive voltage end and the negative voltage end of the DC input power source, or the at least one second semiconductor switch is coupled between the positive voltage end and the negative voltage end of the two output capacitors; wherein a delay time is introduced between turning on the first semiconductor switch and turning on the at least one second semiconductor switch, (b) detecting whether any one of the two output capacitors is abnormal, and (c) controlling the protection circuit to decouple the DC input power sources from the two output capacitors in a shorted-circuit manner when any one of the two output capacitors is abnormal.

2. The method of operating the power conversion system with abnormal energy protection of claim 1, wherein the protection circuit is coupled between the DC input power sources and the DC power converters, and the protection circuit further comprises a plurality of diodes, wherein a first branch is formed by the plurality of diodes, the resistor, and the first semiconductor switch, and a second branch is formed by the plurality of diodes and the second semiconductor switch, in the step (c), first turning on the first semiconductor switch to make electrical energy generated from the DC input power sources be delivered through the first branch, and then turning on the second semiconductor switch after the delay time to make the electrical energy be delivered through the second branch when any one of the two output capacitors is abnormal.

3. The method of operating the power conversion system with abnormal energy protection of claim 1, wherein the protection circuit is coupled between the DC input power sources and the DC power converters, and the protection circuit further comprises a plurality of diodes, wherein a first branch is formed by the plurality of diodes, the resistor, and the first semiconductor switch, and a second branch is formed by the plurality of second semiconductor switches, in the step (c), first turning on the first semiconductor switch to make electrical energy generated from the DC input power sources be delivered through the first branch, and then turning on the second semiconductor switches after the delay time to make the electrical energy be delivered through the second branch when any one of the two output capacitors is abnormal.

4. The method of operating the power conversion system with abnormal energy protection of claim 1, wherein the protection circuit is coupled between the DC power converters and the two output capacitors, and the protection circuit further comprises a diode, wherein a first branch is formed by the diode, the resistor, and the first semiconductor switch, and a second branch is formed by the diode and the second semiconductor switch, in the step (c), first turning on the first semiconductor switch to make electrical energy generated from the DC input power sources be delivered through the first branch, and then turning on the second semiconductor switch after the delay time to make the electrical energy be delivered through the second branch when any one of the two output capacitors is abnormal.

\* \* \* \* \*